US012783183B2

(12) United States Patent
Shimamoto

(10) Patent No.: US 12,783,183 B2
(45) Date of Patent: Nov. 3, 2026

(54) INFORMATION PROCESSING APPARATUS AND METHOD AND NON-TRANSITORY COMPUTER READABLE MEDIUM

(71) Applicant: FUJIFILM BUSINESS INNOVATION CORP., Tokyo (JP)

(72) Inventor: Tsutomu Shimamoto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/180,901

(22) Filed: Mar. 9, 2023

(65) Prior Publication Data

US 2024/0103777 A1 Mar. 28, 2024

(30) Foreign Application Priority Data

Sep. 22, 2022 (JP) ................................ 2022-151106

(51) Int. Cl.
*G06F 3/12* (2006.01)
*G06F 40/103* (2020.01)
*G06F 40/151* (2020.01)

(52) U.S. Cl.
CPC ............ *G06F 3/1206* (2013.01); *G06F 3/121* (2013.01); *G06F 3/1224* (2013.01); *G06F 3/1253* (2013.01); *G06F 40/103* (2020.01); *G06F 40/151* (2020.01); *G06F 3/1222* (2013.01); *G06F 3/1238* (2013.01)

(58) Field of Classification Search
CPC ...... G06F 3/1206; G06F 3/121; G06F 3/1224; G06F 3/1253; G06F 40/103; G06F 40/151; G06F 3/1222; G06F 3/1238
See application file for complete search history.

(56) References Cited

U.S. PATENT DOCUMENTS

| | | | | |
|---|---|---|---|---|
| 2001/0013070 A1* | 8/2001 | Sasaki | H04L 67/04 | 709/249 |
| 2007/0299965 A1* | 12/2007 | Nieh | H04L 41/5025 | 709/224 |
| 2016/0366292 A1* | 12/2016 | Anezaki | H04W 8/005 | |
| 2018/0284957 A1* | 10/2018 | Afsari | H04L 65/403 | |
| 2023/0022478 A1* | 1/2023 | Batchu | H04L 63/083 | |
| 2023/0409680 A1* | 12/2023 | Blachman | H04L 63/0281 | |

FOREIGN PATENT DOCUMENTS

JP 2011-145918 A 7/2011

* cited by examiner

*Primary Examiner* — Iriana Cruz
(74) *Attorney, Agent, or Firm* — Oliff PLC

(57) ABSTRACT

An information processing apparatus includes a processor configured to: execute first sending processing if a response to a request sent to an external service via a converter is not successfully received, the first sending processing being processing for sending the request to the external service without using the converter; execute second sending processing for sending at least part of data included in a response to the converter, the response being returned from the external service as a response to the request sent in the first sending processing; and receive a conversion result of the at least part of the data from the converter and execute predetermined processing by using the conversion result.

7 Claims, 5 Drawing Sheets

INFORMATION PROCESSING APPARATUS AND METHOD AND NON-TRANSITORY COMPUTER READABLE MEDIUM

CROSS-REFERENCE TO RELATED APPLICATIONS

This application is based on and claims priority under 35 USC 119 from Japanese Patent Application No. 2022-151106 filed Sep. 22, 2022.

BACKGROUND

(i) Technical Field

The present disclosure relates to an information processing apparatus and method and a non-transitory computer readable medium.

(ii) Related Art

A system called remote browser isolation (RBI) is available. The RBI system is disposed between a client terminal and a website, analyzes a webpage provided by the website, removes security threats from the webpage, converts the webpage to an image, and provides the image to the client terminal. A web browser (hereinafter simply called a browser) on the client terminal displays this image and sends information on the coordinates of the image clicked by a user or characters input by the user to the RBI system. The RBI system then converts the information sent from the browser into a format corresponding to the webpage and sends it to the website.

Japanese Unexamined Patent Application Publication No. 2011-145918 discloses the following system. A proxy server corrects a hypertext markup language (HTML) source included in a response from a website and returns the response including the corrected HTML source to a web browser. In this system, the proxy server corrects the HTML source so that mishandling of a web application is less likely to occur.

SUMMARY

It is becoming common for an information processing apparatus, such as a multifunction device, to use a web service, such as a cloud service, disposed outside the information processing apparatus. An example of such a case is that an information processing apparatus performs login authentication for a user to access the information processing apparatus by utilizing an external single sign-on authentication service.

It is not unusual, however, that software for processing HTML data, such as a browser, loaded in an information processing apparatus (multifunction device, for example) is unable to be updated or it is not updated even if it is possible. Hence, the information processing apparatus may fail to support a web service using the latest web technology.

To address this issue, the RBI technology may be applied. A converter, such as an RBI system, is disposed between an information processing apparatus and an external service, such as a web service. The RBI system first converts an HTTP response sent from the external service into a format that the information processing apparatus can handle and then supplies the converted HTTP response to the information processing apparatus.

In the system configuration in which an information processing apparatus uses an external service via a converter, there may be a case in which the information processing apparatus becomes unable to use the external service and the reason for this may be due to the occurrence of a communication failure between the converter and the external service.

Aspects of non-limiting embodiments of the present disclosure relate to making it possible for an information processing apparatus to use an external service even in a situation where the information processing apparatus is unable to use the external service due to a communication failure between a converter and the external service.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: execute first sending processing if a response to a request sent to an external service via a converter is not successfully received, the first sending processing being processing for sending the request to the external service without using the converter; execute second sending processing for sending at least part of data included in a response to the converter, the response being returned from the external service as a response to the request sent in the first sending processing; and receive a conversion result of the at least part of the data from the converter and execute predetermined processing by using the conversion result.

BRIEF DESCRIPTION OF THE DRAWINGS

An exemplary embodiment of the present disclosure will be described in detail based on the following figures, wherein.

DETAILED DESCRIPTION

An exemplary embodiment for carrying out the disclosure will be described below with reference to the accompanying drawings.

Figure 1:
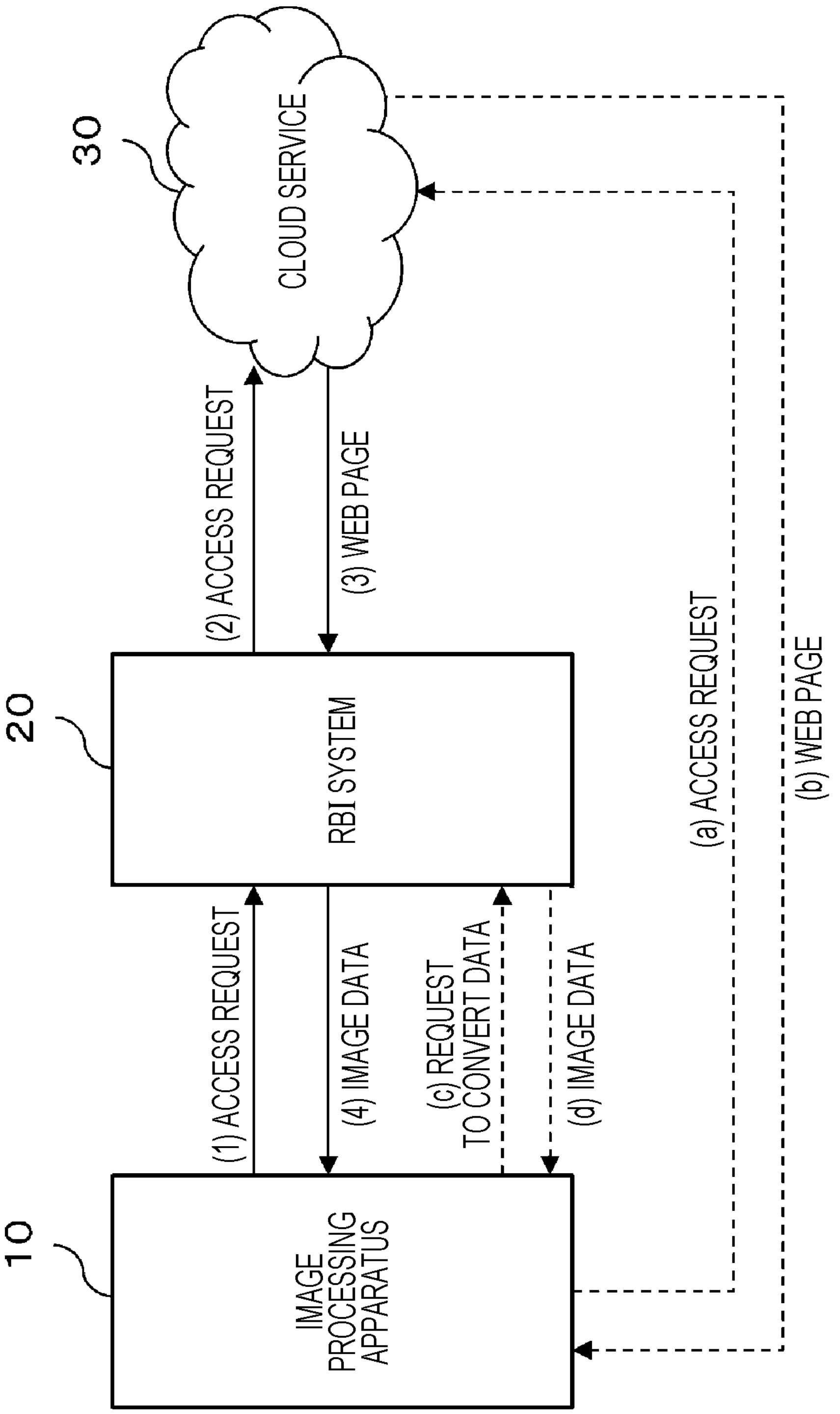
FIG. 1 illustrates an example of the schematic configuration of a system according to the exemplary embodiment.

FIG. 1 illustrates an example of the configuration of a system including an image processing apparatus 10, which is an example of an information processing apparatus.

In this system, the image processing apparatus 10 is connected to a remote browser isolation (RBI) system 20 and also to a cloud service 30 via a data communication network, such as a local area network (LAN) and the internet.

The image processing apparatus 10 is a device having at least one of a print function, a scan function, and a copy function and provides such functions to a user. Examples of the image processing apparatus 10 are a printer, a scanner, a copying machine, and a multifunction device (device having multiple functions, such as a print function, a scan function, and a copy function).

The image processing apparatus 10 includes hardware for executing image processing, such as a print mechanism for printing an image on a medium (paper, for example) or a scan mechanism for scanning an image formed on a medium.

The image processing apparatus 10 includes an information processor that executes various types of information processing operations, such as image processing control, information processing related to image processing, and user interface (UI) processing. Examples of information processing related to image processing are management of jobs, such as management of printing and scanning that a user has provided an instruction to perform, information processing for a scanned image, processing and editing of an image to be printed. Examples of information processing for a scanned image are character recognition, translation of a character recognition result, and data entry into a form.

The information processor of the image processing apparatus 10 may use an external service, such as a cloud service 30, to execute information processing. The external service is a server disposed outside the image processing apparatus 10.

In one case, the information processor sends a scanned image to a cloud service 30 that provides a character recognition service, receives a character recognition result from the cloud service 30, and generates a document file including the character recognition result. In another case, to authenticate a user using the image processing apparatus 10, the information processor requests a cloud service 30 that provides a user authentication service to authenticate this user. In another case, the information processor downloads a document registered by a user from a cloud service 30 that provides a storage service and prints the document. These cases are only examples, and the image processing apparatus 10 can use different cloud services 30.

The information processor of the image processing apparatus 10 includes a web client. The web client is client software for using a service on a world wide web (WWW). The web client communicates with an external service, such as a cloud service 30, by using a hypertext transfer protocol (HTTP). The web client sends an HTTP request to the cloud service 30, receives an HTTP response from the cloud service 30 as a response to the HTTP request, and executes processing based on the HTTP response. Examples of the web client is a web browser and an application which executes information processing in collaboration with the cloud service 30 on a web. The web browser, which is one example of the web client, generates a UI screen of the image processing apparatus 10, for example. The application, which is another example of the web client, may be an application for downloading a user document from the cloud service 30 and printing the downloaded document.

The cloud service 30 is a server that provides a service to the image processing apparatus 10 by using a web via a network, such as the internet. The cloud service 30 is an example of an external service that processes an HTTP request received from a web client and returns an HTTP response to the web client.

Although only one cloud service 30 is shown in FIG. 1, different cloud services 30, such as a cloud service providing an authentication service and a cloud service providing a storage service, may be provided. A web server that simply provides web pages is also an example of the cloud service 30.

The RBI system 20, which is an example of a converter, converts an HTTP response returned from the cloud service 30 to a form that can be handled by the web client integrated in the image processing apparatus 10. The web client loaded in the image processing apparatus 10 is not necessarily updated to a state in which it can support the latest web technology, in which case, the web client may not be able to suitably process an HTTP response returned from the cloud service 30. The RBI system 20 converts an HTTP response that the web client of the image processing apparatus 10 is unable to suitably process into data (image data, for example) of a format that the web client is able to process. The data conversion function of the RBI system 20 may be similar to that of a known RBI system.

The solid arrows in FIG. 1 indicate a data flow when the image processing apparatus 10, RBI system 20, cloud service 30, and networks connecting them are operating under the normal conditions in the system of the exemplary embodiment. Such a data flow under the normal conditions will be specifically explained below. When executing processing using the cloud service 30, (1) an HTTP access request generated by the image processing apparatus 10 is sent to the RBI system 20; (2) the HTTP access request is sent to the cloud service 30 via the RBI system 20; and (3) the cloud service 30 generates an HTTP response including a web page, for example, as a response to the HTTP access request and returns the HTTP response to the RBI system 20. The HTTP response may include data that the web client of the image processing apparatus 10 is unable to correctly process, such as data described in JavaScript (registered trademark). The RBI system 20 converts such data into data of a predetermined format that the web client can handle. For example, if the HTTP response includes image data described in JavaScript that the web client is unable to handle, the RBI system 20 converts such image data into jpeg image data, for example, that the web client is able to handle. Then, (4) the RBI system 20 sends the converted data to the web client of the image processing apparatus 10.

If a failure occurs in a data communication network between the RBI system 20 and the cloud service 30, the image processing apparatus 10 becomes unable to use the cloud service 30 based on the data flow indicated by the solid arrows in FIG. 1.

In this case, the image processing apparatus 10 attempts to use the cloud service 30, based on the data flow indicated by the broken-line arrows in FIG. 1. More specifically, (a) the web client of the image processing apparatus 10 sends an HTTP access request to the cloud service 30 and (b) the web client receives an HTTP response, such as a web page, returned from the cloud service 30. As discussed above, however, the HTTP response may include data that the web client is unable to handle. Then, (c) the web client sends the HTTP response to the RBI system 20 and requests it to convert the HTTP response; and (d) the RBI system 20 converts the HTTP response to data (image data, for example) of a predetermined format that the web client is able to handle and returns the converted data to the web client.

An overview of the system according to the exemplary embodiment has been discussed. A more detailed processing sequence will be described below with reference to FIG. 2.

Figure 2:
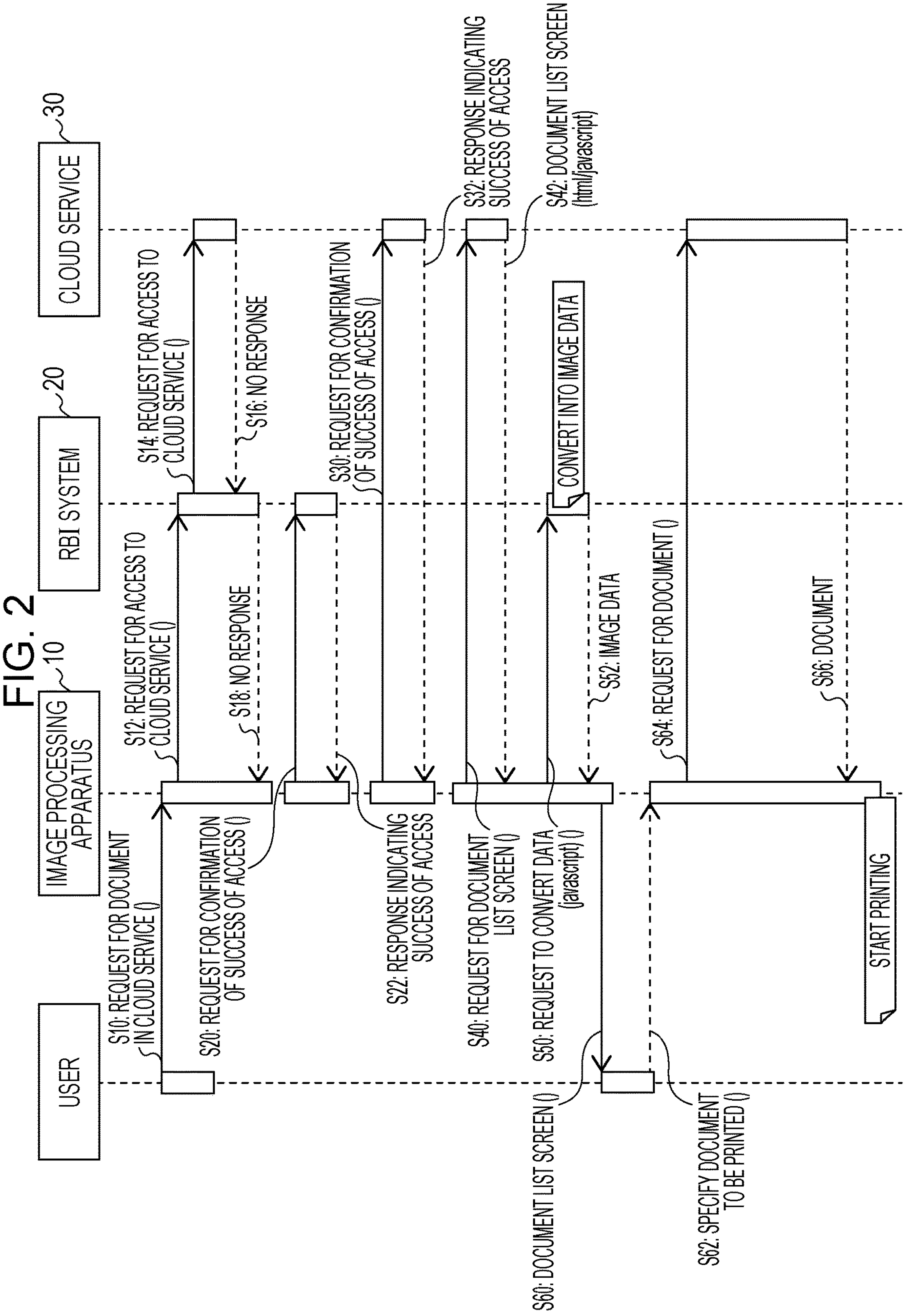
FIG. 2 is a sequence diagram illustrating the operation of the system according to the exemplary embodiment.

In the example in FIG. 2, it is assumed that the cloud service 30 is a service that provides a storage service. In the information processor of the image processing apparatus 10, a cloud print application for downloading a document registered in the cloud service 30 and printing the document is installed. The cloud print application accesses the cloud service 30, obtains and displays a list of documents of a user, instructs the user to select a document to be printed, downloads the selected document from the could service 30, and causes the print mechanism to print the downloaded document.

At the timing at which the sequence shown in FIG. 2 is started, a menu indicating a list of applications stored in the image processing apparatus 10 is displayed on the operation screen of the image processing apparatus 10. The menu includes as options the above-described cloud print application, as well as applications for providing basic functions, such as scanning and copying. It is assumed that, at this timing, the user has finished user authentication for using the image processing apparatus 10 and the cloud service 30.

In the example in FIG. 2, it is also assumed that a failure is occurring on a communication path between the RBI system 20 and the cloud service 30 and the RBI system 20 is unable to communicate with the cloud service 30.

Hereinafter, for a simple description, "the cloud print application installed in the information processor of the image processing apparatus 10 executes processing" will simply be called that "image processing apparatus 10 executes processing".

In the sequence shown in FIG. 2, in step S10, a user first selects the cloud print application on the menu. Then, the image processing apparatus 10 issues an HTTP request for an access request to the cloud service 30. In step S12, the HTTP request is sent to the RBI system 20. In step S14, the RBI system 20 sends the HTTP request received from the image processing apparatus 10 to the cloud service 30.

Since a communication failure is occurring between the RBI system 20 and the cloud service 30, in step S16, a certain wait time elapses without any response from the cloud service 30 as a response to the HTTP request sent in step S14. In step S18, a certain wait time also elapses in the image processing apparatus 10 without any response to the HTTP request sent in step S12.

To find out why there is no response to the HTTP request sent in step S12, the image processing apparatus 10 sends a confirmation request to confirm the success of access to the RBI system 20 in step S20, and also sends the same request to the cloud service 30 in step S30. In this example, it is assumed that the communication path between the image processing apparatus 10 and the RBI system 20 and that between the image processing apparatus 10 and the cloud service 30 are functioning properly and that the RBI system 20 and the cloud service 30 are both operating properly. Accordingly, in step S22, the RBI system 20 returns a response indicating the success of access to the image processing apparatus 10 as a response to the confirmation request sent in step S20, and, in step S32, the cloud service 30 also returns the same response to the image processing apparatus 10 as a response to the confirmation request sent in step S30.

Upon receiving the response indicating the success of access in steps S22 and S32, the image processing apparatus 10 can recognize that the occurrence of a timeout error in step S18 is due to a communication failure between the RBI system 20 and the cloud service 30. Then, in step S40, the image processing apparatus 10 directly sends an HTTP request for a document list screen of the user to the cloud service 30. The document list screen of the user is the screen of a list of documents registered in the cloud service 30 by this user. In the example in FIG. 2, the document list screen is a web page including an element described in JavaScript. Examples of such an element are a request for a document to an application programming interface (API) for downloading a document of the cloud service 30 and an element that appears to be described in JavaScript on the screen. Then, in step S42, the cloud service 30 returns an HTTP response including data of the document list screen to the image processing apparatus 10.

Upon receiving this HTTP response, in step S50, the image processing apparatus 10 sends an element described in JavaScript included in the HTTP response to the RBI system 20 and requests it to convert the element. The element described in JavaScript is an example of data that the image processing apparatus 10 is unable to suitably process. The image processing apparatus 10 stores various types of data that it is unable to suitably process. If a received HTTP response includes such a type of data, the image processing apparatus 10 requests the RBI system 20 to convert the data. Examples of the types of data that the image processing apparatus 10 is unable to suitably process are data described in a predetermined type of language, such as JavaScript, and data for which the image processing apparatus 10 is required to access an external service other than the cloud service 30 to execute processing indicated by data. As an example of the case of the second type of data, the image processing apparatus 10 accesses and requests an external service to perform user authentication using the second type of data in order to use the cloud service 30.

The image processing apparatus 10 may alternatively store the types of data that it is able to suitably process, and if data other than such types of data is found in a received HTTP response, the image processing apparatus 10 may request the RBI system 20 to convert the data.

In another example, the image processing apparatus 10 may send the entirety of a received HTTP response to the RBI system 20 and request it to convert the HTTP response.

The image processing apparatus 10 keeps the HTTP response received in step S42 for a subsequent process (step S64, for example).

The RBI system 20 converts the data received from the image processing apparatus 10 into data of a predetermined format that the image processing apparatus 10 can handle. For example, the RBI system 20 converts data described in JavaScript into image data in the jpeg format indicating the image represented by the JavaScript data. The image processing apparatus 10 can display such image data. Then, in step S52, the RBI system 20 sends the converted data, such as image data, to the image processing apparatus 10.

In step S60, the image processing apparatus 10 generates a document list screen by using the cloud print application, based on the converted data returned from the RBI system 20, and displays the document list screen on a display, such as a touchscreen, of the image processing apparatus 10. The document list screen displayed in step S60 is an example of an operation screen generated by using the conversion result sent from the converter. The user selects one or more documents to be printed from the documents displayed on the document list screen. For example, the user selects a desired document by tapping it on the document list of the document list screen displayed on the touchscreen and taps a print execute button on the document list screen. In step S62, the image processing apparatus 10 receives such an input operation from the user and recognizes the document selected by the user.

Then, the image processing apparatus 10 executes the JavaScript program included in the HTTP response, which is obtained in step S42 and is stored in the image processing apparatus 10, so as to execute the API for downloading a document registered in the cloud service 30. Then, in step S64, an HTTP request for obtaining the document selected by the user is sent from the image processing apparatus 10 to the cloud service 30. The HTTP request sent in step S64 is an example of a second request based on the input operation from the user. In step S66, the cloud service 30 returns the document to the image processing apparatus 10 in response to the received HTTP request. The image processing apparatus 10 receives this document and causes the print mechanism to print the document.

As described above, in the exemplary embodiment, if the image processing apparatus 10 is unable to use the cloud service 30 via the RBI system 20, it directly sends a request to the cloud service 30 and receives a response from the cloud service 30. Then, the image processing apparatus 10 sends this response to the RBI system 20 and requests it to convert the response to data that the image processing apparatus 10 can handle. This enables the image processing apparatus 10 to execute processing in accordance with HTTP data sent from the cloud service 30.

If, as a result of executing steps S20 and S30, the image processing apparatus 10 recognizes that it is unable to access at least one of the RBI system 20 and the cloud service 30, it may display an error message on the screen. The error message may be a message indicating that the cloud service 30 is not accessible, for example. The content of an error message may be varied depending on which one of the RBI system 20 and the cloud service 30 is not accessible.

If no response is returned from the cloud service 30 in response to an access request sent in step S14, the RBI system 20 may notify the image processing apparatus 10 that no response is returned from the cloud service 30, as a response to the access request sent in step S12. In this case, the image processing apparatus 10 may omit to send a confirmation request to confirm the success of access to the RBI system 20 in step S20.

Modified examples will be described below.

In the above-described processing shown in FIG. 2, the image processing apparatus 10 keeps the HTTP response including the JavaScript API sent from the cloud service 30, and executes the API in response to the later input operation performed by the user. In this mode, however, the image processing apparatus 10 may perform an illegal operation when executing JavaScript, which is not desirable for security reasons.

In a first modified example, the RBI system 20 is instructed to execute the JavaScript API included in the HTTP response.

Figure 3:
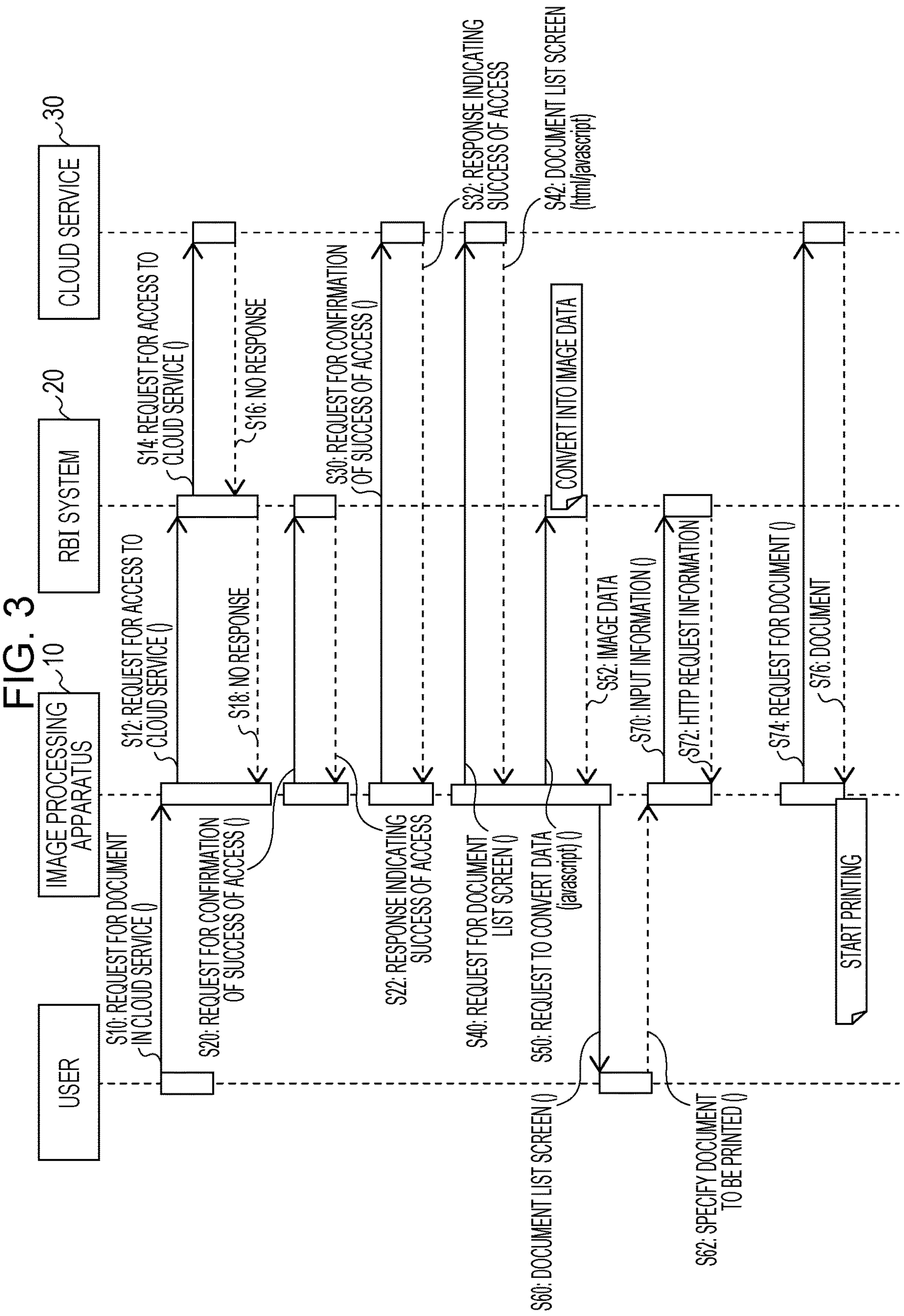
FIG. 3 is a sequence diagram illustrating the operation of a system according to a first modified example.

FIG. 3 illustrates a processing sequence of the first modified example. In the sequence shown in FIG. 3, steps S10 through S62 are similar to those in FIG. 2. In the sequence in FIG. 3, however, the image processing apparatus 10 discards the HTTP response obtained from the cloud service 30 in step S42 after it requests the RBI system 20 to convert necessary data in step S50. This reduces the risk that a program, such as JavaScript, included in the HTTP response may be illegally executed.

In the sequence in FIG. 3, upon receiving the input operation from the user in step S62, the image processing apparatus 10 sends input information indicating the content of the input operation to the RBI system 20 in step S70. This input information indicates what kind of operation (tapping or double-tapping, for example) is performed at which position on the document list screen.

The RBI system 20 keeps the HTTP response which is received by the image processing apparatus 10 from the cloud service 30 in step S42 and is received from the image processing apparatus 10 in step S50 and has executed processing, which would be performed by the web browser based on the HTTP response, for example. Hence, upon receiving the input information in step S70, the RBI system 20 generates an HTTP request, which would be generated by the web browser when the operation indicated by the input information is received. That is, in accordance with the content of the operation indicated by the input information, the RBI system 20 executes the API of the cloud service 30 described in JavaScript and included in the HTTP response, thereby generating an HTTP request to request the cloud service 30 to download a document selected by the user. In step S72, the RBI system 20 returns information on the generated HTTP request to the image processing apparatus 10.

In step S74, the image processing apparatus 10 executes the HTTP request received from the RBI system 20 so as to request the cloud service 30 to download the document selected by the user. In step S76, the cloud service 30 returns the document to the image processing apparatus 10. The image processing apparatus 10 receives the document and causes the print mechanism to print the document.

As described above, in the first modified example, the image processing apparatus 10 sends information on the input operation received from the user to the RBI system 20, and the RBI system 20 executes JavaScript in accordance with the content of the input operation and returns the processing result to the image processing apparatus 10. This saves the image processing apparatus 10 executing JavaScript, which may be risky in terms of the security.

The first modified example has been discussed by taking JavaScript as an example. However, the first modified example may also be applied to a program described in a language other than JavaScript and data, which may be illegally executed, included in the HTTP response.

Figure 4:
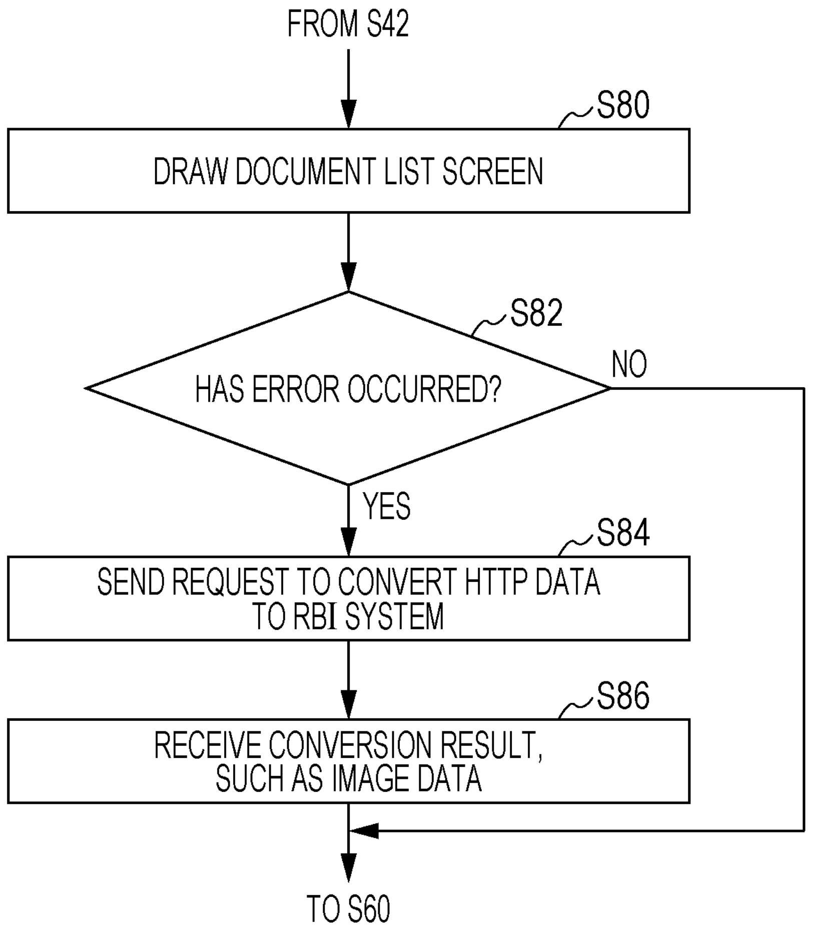
FIG. 4 is a flowchart illustrating a processing procedure according to a second modified example.

A second modified example will be described below. FIG. 4 illustrates the major part of a procedure executed by the image processing apparatus 10, especially by the web client included in the image processing apparatus 10, according to the second modified example.

The procedure shown in FIG. 4 is a modified example of the portion between steps S42 and S60 in FIGS. 2 and 3.

In the procedure in FIG. 4, upon receiving the HTTP response including data of the document list screen from the cloud service 30 in step S42, the image processing apparatus 10 executes the HTTP response to draw the document list screen in step S80. The data of the document list screen may include data, such as JavaScript, that the image processing apparatus 10 may fail to execute. For this reason, in step S82, the image processing apparatus 10 monitors the occurrence of an error during the drawing of the document list screen.

If the result of step S82 is NO, this means that the image processing apparatus 10 has successfully processed the HTTP response. Accordingly, the image processing apparatus 10 does not request the RBI system 20 to convert the HTTP response and executes step 60 to present the document list screen to the user. If the result of step S82 is YES, the image processing apparatus 10 sends the entirety or a predetermined portion of the HTTP response to the RBI system 20 and requests it to convert the HTTP response in step S84. The predetermined portion of the HTTP response to be sent to the RBI system 20 is a portion that the image processing apparatus 10 is highly likely to fail to process, for example, a portion described in a predetermined language, such as JavaScript. In step S86, the image processing apparatus 10 receives the result of converting the HTTP response from the RBI system 20, and executes step S60 and the subsequent steps by using this result.

In another example, instead of the image processing apparatus 10, a user may judge whether the image processing apparatus 10 has successfully processed the HTTP response which is received from the cloud service 30 in step S42. In this example, the image processing apparatus 10 executes the HTTP response and displays the resulting document list screen on the display of the image processing apparatus 10. The image processing apparatus 10 also displays a message which requests the user to notify the image processing apparatus 10 of the presence of any abnormality on the document list screen. The user can notify the image processing apparatus 10 of an abnormality by pressing a predetermined hardware button of the image processing apparatus 10 or a notification button displayed on the document list screen together with the message. If the user recognizes some abnormality on the displayed document list screen, he/she presses the corresponding button. Then, the image processing apparatus 10 requests the RBI system 20 to convert such an abnormal portion, regenerates the document list screen by using data converted by the RBI system 20, and displays the regenerated document list screen.

In the above-described exemplary embodiment and modified examples, the cloud service 30 is a storage service, and the HTTP response from the cloud service 30 indicates a document list screen. This configuration is only an example. The cloud service 30 may be another type of service, such as an authentication service, an optical character recognition (OCR) service, and a translation service. The HTTP response returned from the cloud service 30 may be a response representing information processing which does not involve the displaying of a screen.

Figure 5:
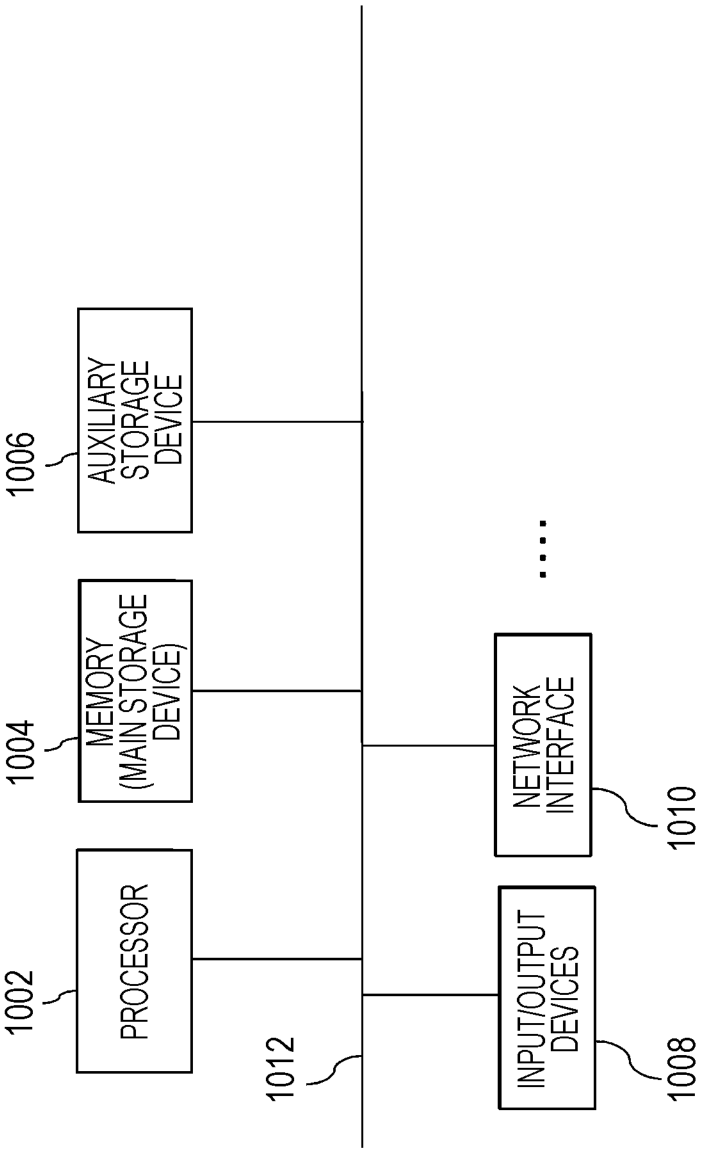
FIG. 5 illustrates an example of the hardware configuration of a computer.

The information processor of the image processing apparatus 10 in the above-described exemplary embodiment is constituted by a general-purpose computer, for example. This computer has the following circuit configuration, as illustrated in FIG. 5, for example. A controller for controlling a processor 1002, a memory (main storage device) 1004, such as a random access memory (RAM), and an auxiliary storage device 1006, which is a non-volatile storage device, such as a flash memory, a solid state drive (SSD), or a hard disk drive (HDD); an interface with various input/output devices 1008; and a network interface 1010 for performing control to connect with a network, such as a LAN, are connected to one another via a data transmission channel, such as a bus 1012. A program describing the content of the processing in the above-described exemplary embodiment is installed in the computer via a network, for example, and is stored in the auxiliary storage device 1006. As a result of the processor 1002 executing the program stored in the auxiliary storage device 1006 by using the memory 1004, the information processing mechanism of the exemplary embodiment is implemented.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An information processing apparatus comprising:

a processor configured to:

execute first sending processing if a response to a request sent to an external service via a converter is not successfully received, the first sending processing being processing for sending the request to the external service without using the converter;

execute second sending processing for sending at least part of data included in a response to the converter, the response being returned from the external service as a response to the request sent in the first sending processing; and receive a conversion result of the at least part of the data from the converter and execute predetermined processing by using the conversion result.

(((2)))

The information processing apparatus according to (((1))), wherein the processor is configured to:

check with the converter whether the converter is accessible from the information processing apparatus and also check with the external service whether the external service is accessible from the information processing apparatus if a response to a request sent to the external service via the converter is not successfully received; and execute the first sending processing, the second sending processing, and the predetermined processing if it is verified that both of the converter and the external service are accessible from the information processing apparatus.

(((3)))

The information processing apparatus according to (((1))) or (((2))), wherein the processor is configured to execute as the predetermined processing:

displaying an operation screen by using the conversion result;

receiving an input operation performed on the operation screen from a user; and sending a second request based on the received input operation to the external service in accordance with information included in the response which is returned from the external service as a response to the request sent in the first sending processing.

(((4)))

The information processing apparatus according to (((1))) or (((2))), wherein the processor is configured to execute as the predetermined processing:

displaying an operation screen by using the conversion result;

receiving an input operation performed on the operation screen from a user;

sending information on the received input operation to the converter;

receiving a second request which is generated by the converter in accordance with the sent information; and sending the second request to the external service.

(((5)))

The information processing apparatus according to one of (((1))) to (((4))), wherein the processor is configured to:

process the response returned from the external service as a response to the request sent in the first sending processing; and execute the second sending processing and the predetermined processing if an error has occurred as a result of processing the response.

(((6)))

A program for causing a computer to execute a process, the process comprising:

executing first sending processing if a response to a request sent to an external service via a converter is not successfully received, the first sending processing being processing for sending the request to the external service without using the converter;

executing second sending processing for sending at least part of data included in a response to the converter, the response being returned from the external service as a response to the request sent in the first sending processing; and receiving a conversion result of the at least part of the data from the converter and executing predetermined processing by using the conversion result.

What is claimed is:

1. An information processing apparatus comprising:

a processor configured to:

execute first sending processing if a response to a request sent to an external service via a converter is not successfully received, the first sending processing being processing for sending the request to the external service without using the converter;

execute second sending processing for sending at least part of data included in a response to the converter, the response being returned from the external service as the response to the request sent in the first sending processing, wherein the sending of the at least part of the data is in response to failure by the processor to process the response from the external service; and receive a conversion result of the at least part of the data from the converter and execute predetermined processing by using the conversion result.

2. The information processing apparatus according to claim 1, wherein the processor is configured to:

check with the converter whether the converter is accessible from the information processing apparatus and also check with the external service whether the external service is accessible from the information processing apparatus if the response to the request sent to the external service via the converter is not successfully received; and execute the first sending processing, the second sending processing, and the predetermined processing if it is verified that both of the converter and the external service are accessible from the information processing apparatus.

3. The information processing apparatus according to claim 1, wherein the processor is configured to execute as the predetermined processing:

displaying an operation screen by using the conversion result;

receiving an input operation performed on the operation screen from a user; and sending a second request based on the received input operation to the external service in accordance with information included in the response which is returned from the external service as the response to the request sent in the first sending processing.

4. The information processing apparatus according to claim 1, wherein the processor is configured to execute as the predetermined processing:

displaying an operation screen by using the conversion result;

receiving an input operation performed on the operation screen from a user;

sending information on the received input operation to the converter;

receiving a second request which is generated by the converter in accordance with the sent information; and sending the second request to the external service.

5. The information processing apparatus according to claim 1, wherein the processor is configured to:

process the response returned from the external service as a response to the request sent in the first sending processing.

6. An information processing method comprising:

executing first sending processing if a response to a request sent to an external service via a converter is not successfully received, the first sending processing being processing for sending the request to the external service without using the converter;

executing second sending processing for sending at least part of data included in a response to the converter, the response being returned from the external service as the response to the request sent in the first sending processing, wherein the sending of the at least part of the data is in response to failure to process the response from the external service; and receiving a conversion result of the at least part of the data from the converter and executing predetermined processing by using the conversion result.

7. A non-transitory computer readable medium storing a program causing a computer to execute a process, the process comprising:

executing first sending processing if a response to a request sent to an external service via a converter is not successfully received, the first sending processing being processing for sending the request to the external service without using the converter;

executing second sending processing for sending at least part of data included in a response to the converter, the response being returned from the external service as the response to the request sent in the first sending processing, wherein the sending of the at least part of the data is in response to failure to process the response from the external service; and receiving a conversion result of the at least part of the data from the converter and executing predetermined processing by using the conversion result.

* * * * *